Sept. 11, 1945.  E. K. KAPRELIAN  2,384,552
VIEW AND RANGE FINDER
Filed Aug. 3, 1944
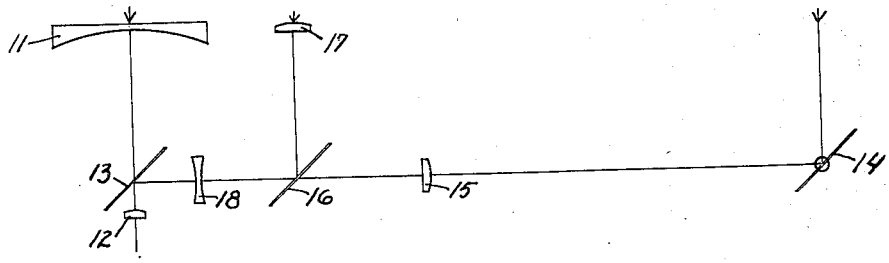
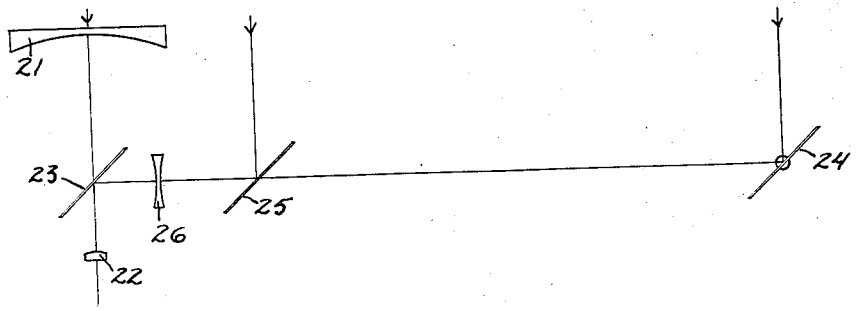
Edward K. Kaprelian
Inventor Patented Sept. 11, 1945

2,384,552

UNITED STATES PATENT OFFICE 2,384,552

VIEW AND RANGE FINDER

Edward K. Kaprelian, Alexandria, Va.

Application August 3, 1944, Serial No. 547,854

4 Claims. (Cl. 88—2.4)

This invention relates to a range and view finder and to an optical system whereby both the scene to be photographed and the rangefinder image may be viewed simultaneously through a single eyepiece.

In all combined view and range finders such as are used with miniature cameras the optical system involved has a magnification of less than one; usually about one-half. The scene to be photographed as well as the image in the rangefinder are therefore seen reduced to one-half natural size. The result is reduced accuracy of the rangefinder setting, due to a reduction of the optical base length by one-half. It is usually desirable to have the rangefinder system operate with a magnification of unity or greater, while the angle of view covered by a normal lens requires that the usual inverted Galilean finder system have a magnification less than unity.

One object of the present invention is to provide a combined viewfinder and rangefinder system in which a single eyepiece is used to view both the rangefinder and viewfinder images.

Another object is to provide a combined viewfinder and rangefinder system wherein the rangefinder and viewfinder images are of different magnification and are superimposed.

Other objects and advantages will become apparent from the following description when read in connection with the accompanying drawing in which:

Fig. 1 shows a combined view and rangefinder system according to the invention.

Fig. 2 shows a modification of the system of Fig. 1.

Fig. 1 shows the usual inverted Galilean finder system including lens 11 and eyepiece 12. Light enters movable deflecting mirror 14 of the range finder system and is diverted through lens 15 through a ray dividing surface 16 which may be the usual semi-transparent mirror. Light from the subject also enters lens 17 which is of the same power as lens 15. Lenses 15 and 17 are displaced equidistantly from surface 16. Both rays join at surface 16 and pass through negative lens 18. The rays are reflected by semi-transparent mirror 13 into eyepiece 12.

The rangefinder image appears magnified by virtue of the rangefinder system in which lenses 15 and 17 are objectives of a Galilean system and lenses 12 and 18 together are negative in effect and act as the usual negative eyepiece of a Galilean telescope. In practice the magnification of the rangefinder system may be between 1½ and 2 times. The magnification of the view- finder system is usually about ½. When viewing a scene through the system one sees the view to be photographed at about ½ natural size and superimposed over the viewfinder image is the rangefinder image.

Because of the difference in size between the viewfinder and the rangefinder images there is no confusion between the two. To further bring about a differentiation between the two images lenses 12 and 18 may be so balanced that one image, i. e., the viewfinder image, is seen at infinity while the other image (in this example the rangefinder image) is seen at a considerably closer distance usually from two to ten feet. The eye can readily and easily accommodate itself to view either image, seeing sharply the image desired while at the same time throwing the unwanted image out of focus so as to further avoid confusion and aid concentration. A further means for helping selection of the image desired is to use color filters in the system. Light yellow and light blue filters placed in back of lenses 15 and 17 respectively aid in distinguishing the images and in obtaining the desired selection.

In the modification of Fig. 2 light enters a finder system similar to that of Fig. 1 and having an inverted Galilean system 21, 21. Light from the subject enters movable deviating mirror 24 and is reflected to semi-transparent mirror 25. Light from the subject also enters mirror 25 directly and both rays are sent thru negative lens 26 to semi-transparent mirror 23 where they are diverted into eyepiece 22. Lenses 22 and 26 are so balanced as to be afocal and have a magnification of approximately unity.

In operation the modification of Fig. 2 is identical with that of Fig. 1 except that the rangefinder image will not appear as highly magnified. In this example, as in Fig. 1, the images of the rangefinder and of the viewfinder may be made to fall at different distances from the eye by changing the normal separation between lenses 22 and 26.

What I claim as my invention and desire to secure by Letters Patent of the United States is:

1. A combination range finder and view finder having a single positive ocular, a negative field lens in front of said ocular and cooperating therewith to provide an image of the field of view at a magnification less than unity, a rangefinder having beam accepting and beam combining elements, semi-transparent reflecting means placed between the ocular and the viewfinder field lens for directing the rangefinder beams into the ocular, a negative lens placed between the rangefinder system and the semi-transparent reflecting means, said negative lens having less power than said negative field lens whereby the range finder image is enlarged with respect to the viewfinder image, said semi-transparent reflecting mirror being closer to said rangefinder negative lens than to said negative field lens whereby the rangefinder images are formed at a different distance in space than is the viewfinder image.

2. A combination range finder and view finder system comprising a positive ocular, a negative field lens in front of said ocular and cooperating therewith to provide an image of the field of view at a magnification less than unity, a range finder having spaced beam accepting elements, beam combining units including lens means for providing images at a magnification greater than that for the field of view and semi-transparent reflecting means positioned in light transmitting relation between said field lens and said ocular for directing the range finder beams through the ocular, a negative lens placed between the rangefinder system and the semi-transparent reflecting means, said negative lens having less power than said negative field lens and located closer to said semi-transparent reflecting means than is the negative field lens whereby the rangefinder images are formed at a different distance in space than is the viewfinder image.

3. In a combined view and range finder of the coincidence type, a partially reflecting ray dividing surface, an inverted Galilean view finder system having its negative element situated before the ray dividing surface and its positive element behind said surface whereby direct beams from an object pass through the negative lens and mirror and through the positive lens, said partially reflecting ray dividing surface receiving the direct and deviated beams from a range finder comprising a rangefinder ray dividing surface, a positive lens spaced before said range finder ray dividing surface and receiving direct beams from an object, a movable mirror for directing deviated beams from an object toward said range finder ray dividing surface at right angles to said direct beams, a positive lens between said mirror and said range finder ray dividing surface having the same power and spacing from said range finder ray dividing surface as the positive lens placed before said ray dividing surface, a negative lens placed between said ray dividing surfaces and acting on the direct and deviated range finder beams, said range finder beams being directed by said view finder ray dividing surface into said range finder positive lens, said rangefinder negative lens being of less power than said viewfinder negative lens and spaced closer to said viewfinder ray dividing surface than is said viewfinder negative lens whereby the rangefinder images appear at a greater magnification and at a different distance from the eye than does the viewfinder image.

4. In a combined viewfinder and range finder for cameras, a view finder portion and a range finder portion, said view finder portion comprising an inverted Galilean system comprising a negative lens facing an object and a positive eyepiece spaced rearwardly therefrom whereby a viewfinder image of magnification of less than unity is produced, said range finder portion comprising a movable mirror for directing deviated beams from an object, a ray dividing surface receiving direct beams from an object and combining said direct and said deviated beams, a negative lens for receiving said combined range finder beams, said negative lens having less power than said viewfinder negative lens, a second ray dividing surface placed between the elements of said viewfinder portion and adapted to receive the combined rangefinder beams after dispersion by said rangefinder negative lens and for directing said beams through said positive viewfinder eyepiece lens, said rangefinder negative lens and said viewfinder eyepiece constituting a Galilean system of approximately unit power whereby said rangefinder beams form an image of approximately unit magnification, said second ray dividing surface being closer to said rangefinder negative lens than to said viewfinder negative lens whereby said rangefinder images form at a different distance from the eyepiece than does the viewfinder image.

EDWARD K. KAPRELIAN.